United States Patent
Carbonne et al.

(10) Patent No.: US 7,665,448 B2
(45) Date of Patent: Feb. 23, 2010

(54) METHOD FOR DETERMINING THE EXHAUST PRESSURE OF A TURBOCHARGED INTERNAL COMBUSTION ENGINE

(75) Inventors: Laure Carbonne, Toulouse (FR); Patrick Cremona, Mondouzil (FR); Roger Rouphael, L'Union (FR)

(73) Assignee: Continental Automotive France, Toulouse (FR)

( * ) Notice: Subject to any disclaimer, the term of this patent is extended or adjusted under 35 U.S.C. 154(b) by 517 days.

(21) Appl. No.: 11/632,844

(22) PCT Filed: Jul. 11, 2005

(86) PCT No.: PCT/EP2005/007482
§ 371 (c)(1),
(2), (4) Date: Mar. 20, 2007

(87) PCT Pub. No.: WO2006/008019
PCT Pub. Date: Jan. 26, 2006

(65) Prior Publication Data
US 2008/0053092 A1    Mar. 6, 2008

(30) Foreign Application Priority Data
Jul. 22, 2004    (FR) .................................. 04 08113

(51) Int. Cl.
*F02B 33/44* (2006.01)

(52) U.S. Cl. .................................. 123/559.1; 60/605.1
(58) Field of Classification Search ......... 123/672–703, 123/559.1–564; 60/605.1–612
See application file for complete search history.

(56) References Cited

U.S. PATENT DOCUMENTS 6,715,287 B1    4/2004    Engel et al.

FOREIGN PATENT DOCUMENTS

| | | |
|---|---|---|
| DE | 42 14 648 | 11/1993 |
| EP | 1 221 544 | 7/2002 |
| EP | 1 416 138 | 5/2004 |
| JP | 2000-356162 | 12/2000 |

*Primary Examiner*—Thomas Denion
*Assistant Examiner*—Douglas J. Duff
(74) *Attorney, Agent, or Firm*—Young & Thompson

(57) ABSTRACT

A method for determining the exhaust pressure ($P_r$) of a turbocharged internal combustion engine, including a solenoid by-pass valve for the exhaust gas, characterized in that an exhaust pressure ($P_i$) is determined as a function of the inlet air flow to the engine, ($A_r$), the engine speed ($R_r$) and the degree of opening of the solenoid exhaust by-pass valve ($T_r$), by interpolation from a reference map having exhaust gas pressure values ($P_c$) for given inlet air flow values ($A_c$), the engine speed ($R_c$) and the degree of opening of the solenoid exhaust by-pass valve ($T_c$), and the exhaust pressure determined by the interpolation ($P_i$) is corrected as a function of ambient pressure values ($P_a$, $P_o$).

13 Claims, 2 Drawing Sheets

METHOD FOR DETERMINING THE EXHAUST PRESSURE OF A TURBOCHARGED INTERNAL COMBUSTION ENGINE

The invention relates to a method of determining the exhaust pressure of a turbocharged internal combustion engine, and to a method of regulating such an engine.

The exhaust pressure is an important piece of data for regulating a turbocharged internal combustion engine in order to take account of the back pressures. In the prior art, this pressure is determined by means of a pressure sensor arranged in the exhaust manifold. However, given its position, the sensor must be able to withstand high temperatures, thereby making its manufacture more complex and its cost more substantial.

A problem that the present invention aims to solve is that of determining the exhaust pressure without using a sensor in the exhaust manifold.

According to the invention, the exhaust pressure is determined, as a function of the engine intake air flow rate, of the engine speed and of the degree of opening of the solenoid valve used for bypassing the exhaust gases (commonly referred to as a wastegate), by an interpolation from a reference map comprising exhaust pressure values for defined values of the intake air flow rate, of the engine speed and of the degree of wastegate opening.

This exhaust pressure determined by interpolation is then corrected, as a function of the ambient pressure prevailing during the determination of the exhaust pressure and of the ambient pressure prevailing during the production of the map, according to the formula which follows.

Thus, according to the invention, the pressure sensor in the exhaust is eliminated, the pressure being determined from an interpolation performed by a computer using a reference map established on a test bench.

Other particular features and advantages of the present invention will become apparent from the detailed description of the example illustrated in the appended figures.

According to the invention, a reference map is established for a given type of engine (internal combustion engine). This map is produced from an engine on a test bench. The map is obtained by carrying out a number of exhaust pressure measurements $P_c$, each exhaust measurement being conducted for a defined value of the intake air flow rate $A_c$, of the engine speed $R_c$ and of the degree of wastegate opening $T_c$. The degree of opening is between 0 and 100% and it represents the position of greater or lesser opening of the wastegate.

In the present example, the degree of wastegate opening $T_c$ is represented by the value of the wastegate control.

Figure 1:
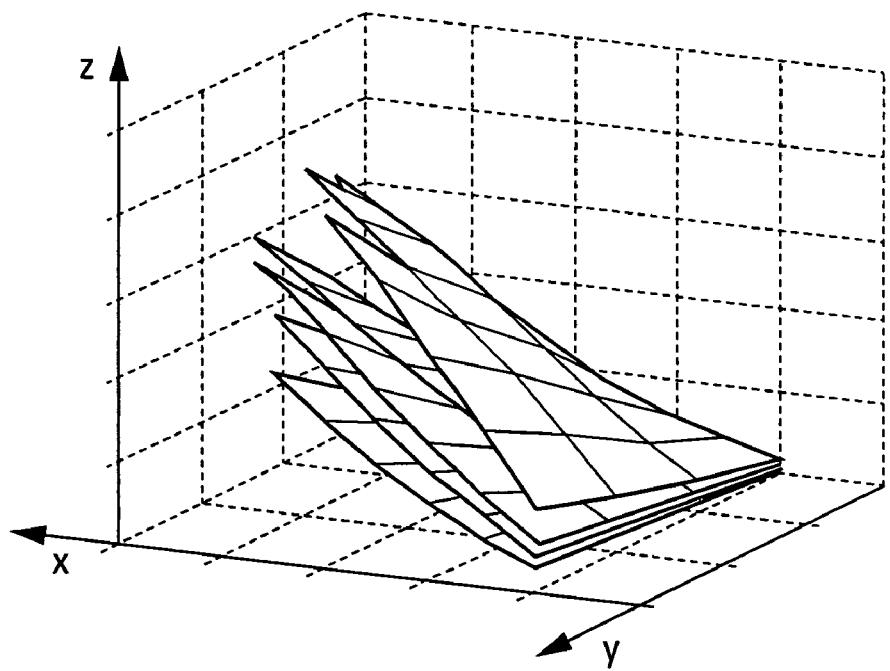
FIG. 1 is a schematic representation of a map representing the exhaust pressure values as a function of intake air flow rate values, engine speed values and wastegate control values.

In the map illustrated in FIG. 1, the air flow rate $A_c$ is expressed in mg for each piston stroke, the engine speed $R_c$ is expressed in revolutions per minute, the value of the wastegate control $T_c$ is expressed as a percentage of the duty cycle of the control (ratio of the duration for which the wastegate is in the opening position in a cycle to the duration of the cycle), and the exhaust pressure $P_c$ is expressed in mbar.

In FIG. 1, the x axis represents the intake air flow rate $A_c$, the y axis represents the engine speed $R_c$, each layer represents a value of the wastegate control $T_c$, and the z axis represents the exhaust pressure $P_c$.

During the use of the given type of engine, the exhaust pressure $P_i$ is determined, as a function of the actual engine intake air flow rate $A_r$, of the actual engine speed $R_r$ and of the actual value of the wastegate control $T_r$, by an interpolation from the reference map produced for this type of engine. Preferably, the interpolation used is a linear interpolation.

Of course, to ensure that this interpolation gives a correct value, the number of intake air flow rate values $A_c$, engine speed values $R_c$ and wastegate control values $T_c$ required to establish the map must be sufficient. Thus, for the wastegate control $T_c$, three or four values (hence three or four layers) are sufficient to obtain a reliable linear interpolation.

The value of the exhaust pressure $P_i$ thus determined by interpolation can then be used to regulate the turbocharged engine.

A correction can be applied to the exhaust pressure determined by the interpolation $P_i$ in order to take account of the ambient pressure $P_a$, more precisely to take account of the difference between the ambient pressure prevailing during the production of the map $P_o$ and that prevailing during the use of the engine $P_a$.

The exhaust pressure $P_i$ can thus be corrected according to the formula which follows:

$$P_r = P_i \left( P_i \left( \frac{1 - \frac{P_a}{P_o}}{K - P_a} \right) + \frac{\frac{K P_a}{P_o} - P_a}{K - P_a} \right)$$

in which K is a corrective factor, $P_r$ is the corrected exhaust pressure, $P_i$ is the exhaust pressure determined by the interpolation, $P_o$ is the ambient pressure prevailing during the production of the map, and $P_a$ is the ambient pressure prevailing during the determination of the exhaust pressure, $P_o$, $P_a$ and K being expressed in mbar.

The corrective factor K, specific to one type of engine, is determined on a test bench by calibrating measurements at different ambient pressures. As can be seen from FIG. 3, for each atmospheric pressure the ratio of the actual exhaust pressure P (measured by a sensor) to the exhaust pressure determined by the interpolation $P_i$ is represented as a function of the exhaust pressure determined by the interpolation $P_i$. This representation is a straight line whose slope and ordinate at the origin depend on the atmospheric pressure at which the measurements are carried out. The corrective factor K is the point of intersection of the various straight lines representing the various tests carried out at different atmospheric pressures.

Figure 3:
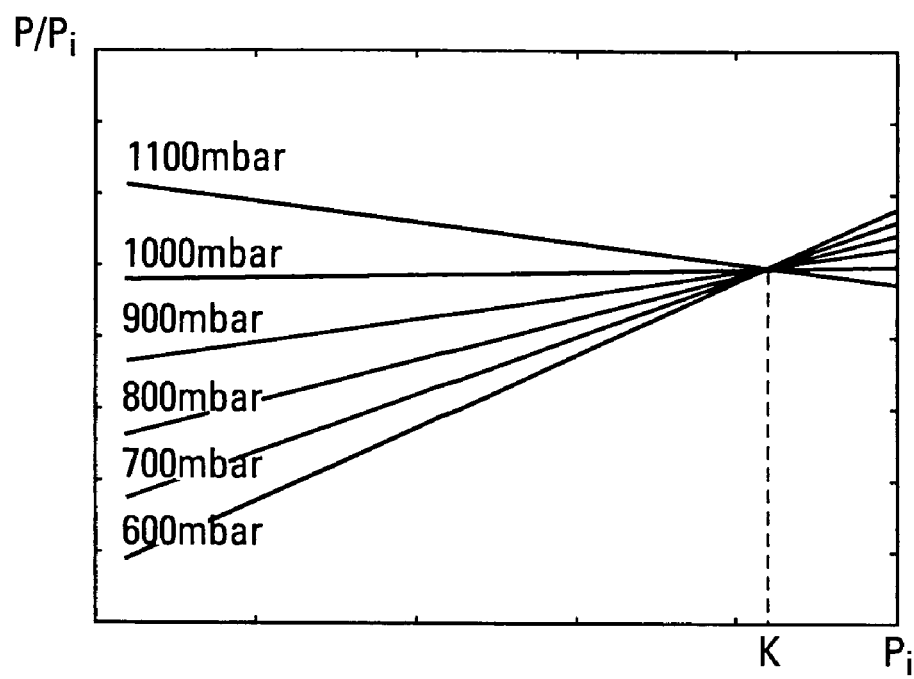
FIG. 3 is a schematic representation illustrating the determination of the corrective factor used for correcting the value of the pressure determined by interpolation.

In FIG. 3, the six atmospheric pressures at which the measurements were carried out are 600, 700, 800, 900, 1000 and 1100 mbar.

Figure 2:
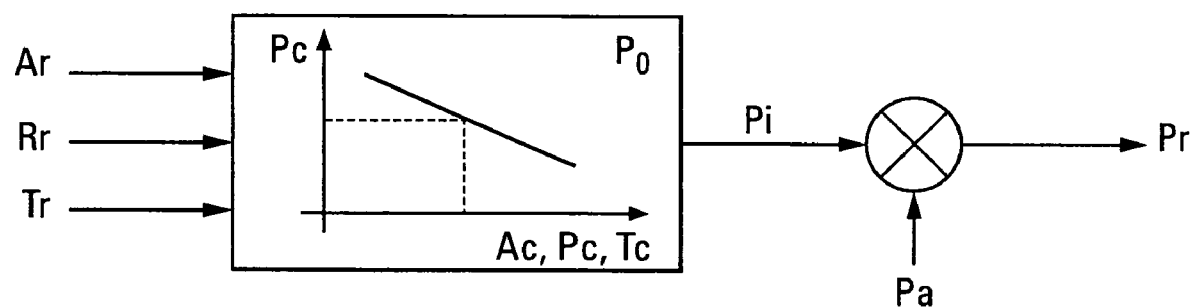
FIG. 2 is a diagram illustrating the process of determining the exhaust pressure by using a map as illustrated in FIG. 1, followed by a correction which makes it possible to take account of the ambient pressure.

FIG. 2 illustrates the method of determining the exhaust pressure $P_r$ with, in a first step, the determination of the exhaust pressure by interpolation $P_i$ from the pre-established reference map as a function of the actual engine intake airflow rate $A_r$, of the actual engine speed $R_r$ and of the actual value of the wastegate control $T_r$, and, in a second step, the determination of the corrected exhaust pressure $P_r$ from the pre-determined corrective factor K as a function of the interpolated exhaust pressure $P_i$, of the ambient pressure prevailing during the production of the map $P_o$, and of the actual ambient pressure $P_a$.

Figure 4:
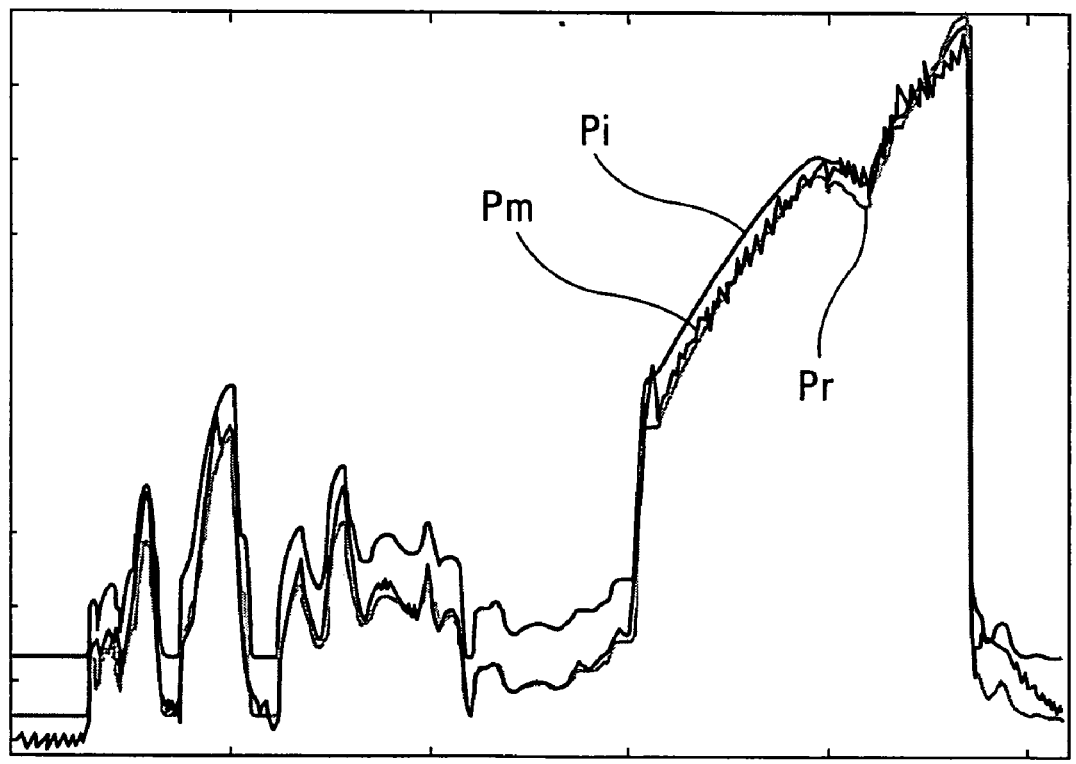
FIG. 4 is a graph comparing the exhaust pressure measured and the exhaust pressure obtained according to the present invention.

As can be seen from FIG. 4, the values of the corrected exhaust pressure $P_r$ agree with the measured exhaust pressure values $P_m$ (measured by a sensor).

It would be possible to apply other corrections in order to further improve the reliability of the determination of the exhaust pressure by computation. These other corrective factors may be the air/fuel ratio of the admitted mixture, the ignition advance delay and the injection interruptions.

It would be possible to produce a map using the intake airflow $A_c$ expressed in kg/h (along the x axis), the wastegate control $T_c$ expressed as a percentage of the duty ratio (along the y axis), each layer thus representing a value of the engine speed, and the z axis representing the exhaust pressure $P_i$. However, the use of such units gives rise to a more complex calibration process.

It would also be possible, to ensure that the wastegate control is even more representative of the actual position of this wastegate, to use the applied control less the adaptation corrections so as to take the drifts and the aging of the wastegate correctly into account. This prevents any drift of the modeled exhaust pressure. The adaptation of the control thus makes it possible to maintain a constant position, which remains represented in the map by the non-corrected control.

It would also be possible to use the actual position of the wastegate instead of the control of this wastegate. However, it is then necessary to use a sensor to determine this position.

The invention claimed is:

1. A method of determining the exhaust pressure ($P_r$) of a turbocharged internal combustion engine comprising a wastegate, characterized in that an exhaust pressure ($P_i$) is determined, as a function of the engine intake air flow rate ($A_r$), of the engine speed ($R_r$) and of the degree of wastegate opening ($T_r$), by an interpolation from a reference map comprising exhaust pressure values ($P_c$) for defined values of the intake air flow rate ($A_c$), of the engine speed ($R_c$) and of the degree of wastegate opening ($T_c$), the exhaust pressure determined by the interpolation ($P_i$) is corrected, as a function of the ambient pressure prevailing during the determination of the exhaust pressure ($P_a$) and of the ambient pressure prevailing during the production of the map ($P_o$), according to the formula which follows:

$$P_r = P_i \left( P_i \left( \frac{1 - \frac{P_a}{P_o}}{K - P_a} \right) + \frac{\frac{K P_a}{P_o} - P_a}{K - P_a} \right)$$

in which $P_r$ is the corrected exhaust pressure, $P_i$ is the exhaust pressure determined by the interpolation, $P_o$ is the ambient pressure prevailing during the production of the map, $P_a$ is the ambient pressure prevailing during the determination of the exhaust pressure, and K is a corrective factor which is specific to the type of engine for which the map was produced and which is predetermined on a test bench by calibrating measurements at different ambient pressures.

2. The method as claimed in claim 1, characterized in that the interpolation used is a linear interpolation.

3. The method as claimed in claim 1, characterized in that the degree of wastegate opening ($T_c$) is represented by the actual position of the wastegate measured by a sensor.

4. The method as claimed in claim 1, characterized in that the degree of wastegate opening ($T_c$) is represented by the value of the wastegate control.

5. The method as claimed in claim 4, characterized in that the wastegate control is the applied control less the adaptation corrections.

6. A method of regulating a turbocharged internal combustion engine as a function of the exhaust pressure, characterized in that the exhaust pressure is determined as claimed in claim 1.

7. The method as claimed in claim 2, characterized in that the degree of wastegate opening ($T_c$) is represented by the actual position of the wastegate measured by a sensor.

8. The method as claimed in claim 2, characterized in that the degree of wastegate opening ($T_c$) is represented by the value of the wastegate control.

9. The method as claimed in claim 3, characterized in that the degree of wastegate opening ($T_c$) is represented by the value of the wastegate control.

10. A method of regulating a turbocharged internal combustion engine as a function of the exhaust pressure, characterized in that the exhaust pressure is determined as claimed in claim 2.

11. A method of regulating a turbocharged internal combustion engine as a function of the exhaust pressure, characterized in that the exhaust pressure is determined as claimed in claim 3.

12. A method of regulating a turbocharged internal combustion engine as a function of the exhaust pressure, characterized in that the exhaust pressure is determined as claimed in claim 4.

13. A method of regulating a turbocharged internal combustion engine as a function of the exhaust pressure, characterized in that the exhaust pressure is determined as claimed in claim 5.

* * * * *